US012538879B2

(12) United States Patent
Redden et al.

(10) Patent No.: US 12,538,879 B2
(45) Date of Patent: Feb. 3, 2026

(54) MODULAR PRECISION AGRICULTURE SYSTEM

(71) Applicant: Deere & Company, Moline, IL (US)

(72) Inventors: Lee Kamp Redden, Palo Alto, CA (US); James Patrick Ostrowski, Sunnyvale, CA (US); Kent Anderson, Sunnyvale, CA (US); Edward William Jeffcott Pell, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 368 days.

(21) Appl. No.: 18/302,662

(22) Filed: Apr. 18, 2023

(65) Prior Publication Data

US 2023/0337601 A1 Oct. 26, 2023

Related U.S. Application Data

(63) Continuation of application No. 17/410,998, filed on Aug. 24, 2021, now Pat. No. 11,659,793, which is a
(Continued)

(51) Int. Cl.
*A01G 22/00* (2018.01)
*A01B 79/00* (2006.01)
(Continued)

(52) U.S. Cl.
CPC ............ *A01G 22/00* (2018.02); *A01B 79/005* (2013.01); *A01C 21/002* (2013.01);
(Continued)

(58) Field of Classification Search
None
See application file for complete search history.

(56) References Cited

U.S. PATENT DOCUMENTS

| 1,059,435 A | 4/1913 | Campbell |
| 2,682,729 A | 7/1954 | Poynor |

(Continued)

FOREIGN PATENT DOCUMENTS

| AU | 2009202785 A1 | 1/2010 |
| CN | 102166548 | 10/2012 |

(Continued)

OTHER PUBLICATIONS

Chaerle, L., et al., "Multi-Sensor Plant Imaging: Towards the Development of a Stress-Catalogue," *Biotechnology Journal*, vol. 4, 2009, pp. 1152-1167.

(Continued)

*Primary Examiner* — Mark R Milia
(74) *Attorney, Agent, or Firm* — Fenwick & West LLP (57) ABSTRACT

A modular system includes a hub and a set of modules removably coupled to the hub. The modules are physically coupled to the frame relative to each other so that each module can operate with respect to a different row of a field. An individual module includes a sensor for capturing field measurement data of individual plants along a row as the modular system moves through the geographic region. An individual module further includes a treatment mechanism for applying a treatment to the individual plants of the row based on the field measurement data before the modular system passes by the individual plants. An individual module further includes a computing device that determines the treatment based on the field measurement data and communicates data to the hub. The hub is communicatively coupled to the modules, so that it may exchange data between the modules and with a remote computing system.

19 Claims, 4 Drawing Sheets

Related U.S. Application Data continuation of application No. 16/725,003, filed on Dec. 23, 2019, now Pat. No. 11,129,343, which is a continuation of application No. 16/405,810, filed on May 7, 2019, now Pat. No. 10,617,071, which is a continuation of application No. 15/061,624, filed on Mar. 4, 2016, now Pat. No. 10,327,393.

(60) Provisional application No. 62/129,400, filed on Mar. 6, 2015.

(51) Int. Cl.
    *A01C 21/00*   (2006.01)
    *A01M 7/00*   (2006.01)
    *A01M 21/04*   (2006.01)
    *G06T 7/00*   (2017.01)

(52) U.S. Cl.
    CPC .......... *A01M 7/0089* (2013.01); *A01M 21/04* (2013.01); *A01M 21/043* (2013.01); *G06T 7/00* (2013.01); *A01M 7/0042* (2013.01); *Y02A 40/10* (2018.01)

(56) References Cited

U.S. PATENT DOCUMENTS

| | | |
|---|---|---|
| 3,892,357 A | 7/1975 | Tamny |
| 3,919,806 A | 11/1975 | Pluenneke et al. |
| 3,967,198 A | 6/1976 | Gensler |
| 4,007,794 A | 2/1977 | Pluenneke et al. |
| 4,015,366 A | 4/1977 | Hall |
| 4,549,355 A | 10/1985 | Sauer et al. |
| 4,905,897 A | 3/1990 | Rogers et al. |
| 4,937,732 A | 6/1990 | Brundisini |
| 4,999,048 A | 3/1991 | Freepons |
| 5,222,324 A | 6/1993 | O'Neall et al. |
| 5,296,702 A | 3/1994 | Beck et al. |
| 5,442,552 A | 8/1995 | Slaughter et al. |
| 5,453,618 A | 9/1995 | Sutton et al. |
| 5,464,456 A | 11/1995 | Kertz |
| 5,499,198 A | 3/1996 | Gaidos et al. |
| 5,507,115 A | 4/1996 | Nelson |
| 5,585,626 A | 12/1996 | Beck et al. |
| 5,606,821 A | 3/1997 | Sadjadi et al. |
| 5,621,460 A | 4/1997 | Hatlestad et al. |
| 5,661,817 A | 8/1997 | Hatlestad et al. |
| 5,768,823 A | 6/1998 | Nelson |
| 5,789,741 A | 8/1998 | Kinter et al. |
| 5,793,035 A | 8/1998 | Beck et al. |
| 5,809,440 A | 9/1998 | Beck et al. |
| 5,837,997 A | 11/1998 | Beck et al. |
| 5,884,224 A | 3/1999 | McNabb et al. |
| 5,911,668 A | 6/1999 | Auerbach et al. |
| 5,924,239 A | 7/1999 | Rees et al. |
| 6,070,539 A | 6/2000 | Flamme et al. |
| 6,160,902 A | 12/2000 | Dickson et al. |
| 6,199,000 B1 | 3/2001 | Keller et al. |
| 6,212,824 B1 | 4/2001 | Orr et al. |
| 6,336,051 B1 | 1/2002 | Pangels et al. |
| 6,553,299 B1 | 4/2003 | Keller et al. |
| 6,574,363 B1 | 6/2003 | Classen et al. |
| 6,671,582 B1 | 12/2003 | Hanley |
| 6,862,083 B1 | 3/2005 | McConnell et al. |
| 6,919,959 B2 | 7/2005 | Masten |
| 6,999,877 B1 | 2/2006 | Dyer et al. |
| 7,032,369 B1 | 4/2006 | Eaton et al. |
| 7,212,670 B1 | 5/2007 | Rousselle et al. |
| 7,248,968 B2 | 7/2007 | Reid |
| 7,263,210 B2 | 8/2007 | Kümmel |
| 7,313,268 B2 | 12/2007 | Luo et al. |
| 7,388,662 B2 | 6/2008 | Cantin et al. |
| 7,408,145 B2 | 8/2008 | Holland |
| 7,412,330 B2 | 8/2008 | Spicer et al. |
| 7,570,783 B2 | 8/2009 | Wei et al. |
| 7,580,549 B2 | 8/2009 | Wei et al. |
| 7,684,916 B2 | 3/2010 | Wei et al. |
| 7,715,013 B2 | 5/2010 | Glaser et al. |
| 7,716,905 B2 | 5/2010 | Wilcox et al. |
| 7,721,515 B2 | 5/2010 | Pollklas et al. |
| 7,723,660 B2 | 5/2010 | Holland |
| 7,792,622 B2 | 9/2010 | Wei et al. |
| 7,876,927 B2 | 1/2011 | Han et al. |
| 7,877,969 B2 | 2/2011 | Behnke |
| 7,894,663 B2 | 2/2011 | Berg et al. |
| 7,904,218 B2 | 3/2011 | Jochem et al. |
| 7,911,517 B1 | 3/2011 | Hunt et al. |
| 8,027,770 B2 | 9/2011 | Poulsen |
| 8,028,470 B2 | 10/2011 | Anderson |
| 8,265,835 B2 | 9/2012 | Peterson et al. |
| 8,537,360 B2 | 9/2013 | Stachon et al. |
| 8,924,030 B2 | 12/2014 | Wendte et al. |
| 9,030,549 B2 | 5/2015 | Redden |
| 2001/0036295 A1 | 11/2001 | Hendrickson et al. |
| 2002/0024665 A1 | 2/2002 | Masten |
| 2003/0009282 A1 | 1/2003 | Upadhyaya et al. |
| 2003/0019949 A1 | 1/2003 | Solie et al. |
| 2005/0000277 A1 | 1/2005 | Giles |
| 2006/0113401 A1 | 6/2006 | Leonhardt et al. |
| 2006/0265106 A1 | 11/2006 | Giles et al. |
| 2007/0044445 A1 | 3/2007 | Spicer et al. |
| 2008/0141585 A1 | 6/2008 | Benfey et al. |
| 2009/0114210 A1 | 5/2009 | Guice et al. |
| 2009/0210119 A1 | 8/2009 | Poulsen |
| 2010/0215222 A1 | 8/2010 | Zeelen et al. |
| 2010/0235017 A1 | 9/2010 | Peltonen et al. |
| 2010/0322477 A1 | 12/2010 | Schmitt et al. |
| 2011/0167721 A1 | 7/2011 | Lejeune et al. |
| 2011/0182478 A1 | 7/2011 | Momesso et al. |
| 2011/0211733 A1 | 9/2011 | Schwarz |
| 2012/0101634 A1* | 4/2012 | Lindores ................ G06F 16/29 709/219 |
| 2012/0101784 A1 | 4/2012 | Lindores et al. |
| 2012/0169504 A1 | 7/2012 | Hillger et al. |
| 2012/0237083 A1 | 9/2012 | Lange et al. |
| 2013/0037625 A1 | 2/2013 | Arenson et al. |
| 2013/0291138 A1 | 10/2013 | Feng et al. |
| 2014/0107957 A1 | 4/2014 | Lindores et al. |
| 2014/0180549 A1 | 6/2014 | Siemens et al. |
| 2014/0331631 A1 | 11/2014 | Sauder et al. |
| 2015/0015697 A1 | 1/2015 | Redden et al. |
| 2015/0027040 A1 | 1/2015 | Redden |
| 2015/0027041 A1 | 1/2015 | Redden |
| 2015/0027044 A1* | 1/2015 | Redden ................ A01M 21/043 47/58.1 R |
| 2016/0029613 A1 | 2/2016 | Hyde et al. |
| 2016/0239727 A1 | 8/2016 | Trissel et al. |
| 2017/0071188 A1 | 3/2017 | Rees |

FOREIGN PATENT DOCUMENTS

| | | |
|---|---|---|
| DE | 19523648 | 1/1997 |
| EP | 2465348 A2 | 6/2012 |
| WO | WO 1997/017830 | 5/1997 |
| WO | WO 2000/003589 | 1/2000 |
| WO | WO 2011/119403 | 9/2011 |
| WO | WO 2012/094116 | 7/2012 |
| WO | WO 2016/090414 A1 | 6/2016 |
| WO | WO 2016/123656 A1 | 8/2016 |

OTHER PUBLICATIONS

European Patent Office, Extended European Search Report and Opinion, EP Patent Application No. 16762241.4, Aug. 14, 2018, 8 pages.

European Patent Office, Summons to Attend Oral Proceedings, EP Patent Application No. 16762241.4, Dec. 19, 2019, 11 pages.

PCT International Search Report and Written Opinion for PCT/US2016/20990, May 27, 2016, 14 Pages.

PCT International Search Report and Written Opinion for PCT/US2014/048507, Jan. 12, 2015, 11 Pages.

(56) References Cited

OTHER PUBLICATIONS

PCT International Search Report and Written Opinion for PCT/US2014/046320, Jan. 9, 2015, 10 Pages.
Rascher, U., et al., "Non-Invasive Approaches for Phenotyping of Enhanced Performance Traits in Bean," *Functional Plant Biology*, vol. 38, 2011, pp. 968-983.
United States Office Action, U.S. Appl. No. 15/061,624, Jan. 24, 2018, 9 pages.
United States Office Action, U.S. Appl. No. 15/061,624, Sep. 7, 2018, 14 pages.
United States Office Action, U.S. Appl. No. 16/725,003, Oct. 14, 2020, 22 pages.

* cited by examiner

MODULAR PRECISION AGRICULTURE SYSTEM

CROSS-REFERENCE TO RELATED APPLICATIONS

This application is a continuation of U.S. patent application Ser. No. 17/410,998, filed on Aug. 24, 2021, now U.S. Pat. No. 11,659,793, which is a continuation of U.S. patent application Ser. No. 16/725,003, filed on Dec. 23, 2019, now U.S. Pat. No. 11,129,343, which is a continuation of U.S. patent application Ser. No. 16/405,810, filed on May 7, 2019, now U.S. Pat. No. 10,617,071, which is a continuation of U.S. patent application Ser. No. 15/061,624, filed on Mar. 4, 2016, now U.S. Pat. No. 10,327,393, issued on Jun. 25, 2019, which claims the benefit of U.S. Provisional Application Ser. No. 62/129,400, filed Mar. 6, 2015, all of these applications are incorporated herein by reference in their entirety for all purposes.

TECHNICAL FIELD

This invention relates generally to the precision agriculture field, and more specifically to a new and useful precision agriculture system and method of control in the precision agriculture field.

BACKGROUND

Automatic, real-time, individual plant identification and treatment systems require a significant amount of computer processing capacity to be available. Remote computing systems that provide such computer processing capacity, commonly referred to as "cloud"-based computing systems, tend to be too slow for use in real-time, in-situ plant identification and treatment. This problem compounds the greater the number of plants that are to be treated simultaneously.

SUMMARY

A modular precision agriculture system (herein referred to simply as a "modular system") is described which includes a hub and a set of modules removably coupled to the hub. The modules are physically coupled to the frame relative to each other so that each module can operate with respect to a different row of a field. An individual module includes a sensor for capturing field measurement data of individual plants along a row as the modular system moves through the geographic region. An individual module further includes a treatment mechanism for applying a treatment to the individual plants of the row based on the field measurement data before the modular system passes by the individual plants. An individual module further includes a computing device that determines the treatment based on the field measurement data and communicates data to the hub. The computing device of a module may also be configured to collect data in a local frame, transform that data to a global frame, and send it to the hub, as well as perform a reverse of that operation for received data. The hub itself is communicatively coupled to the modules, so that it may exchange data between the modules and with a remote computing system, where the exchanged data may include field measurement data, treatment information, failure reports, and failure rectification instructions. By communicating with the hub, modules may indicate what treatments they have performed, and alter their decisions about what treatments to perform in the future based on the treatments and/or data collected by neighboring modules. The modular system may include other components described in the following detailed description.

The modular system enables flexibility in treatment mechanism selection, treatment mechanism placement, imaging mechanism placement, selection of the number of concurrently treated crop rows, or selection of any other suitable system parameter. The modular system can additionally or alternatively enable in- or off-field module exchange to accommodate for component failures, different treatment prescriptions, or the occurrence of any other suitable exchange event.

DESCRIPTION OF THE PREFERRED EMBODIMENTS

The following description of the preferred embodiments of the invention is not intended to limit the invention to these preferred embodiments, but rather to enable any person skilled in the art to make and use this invention.

A. Computing Process Allocation

Figure 6:
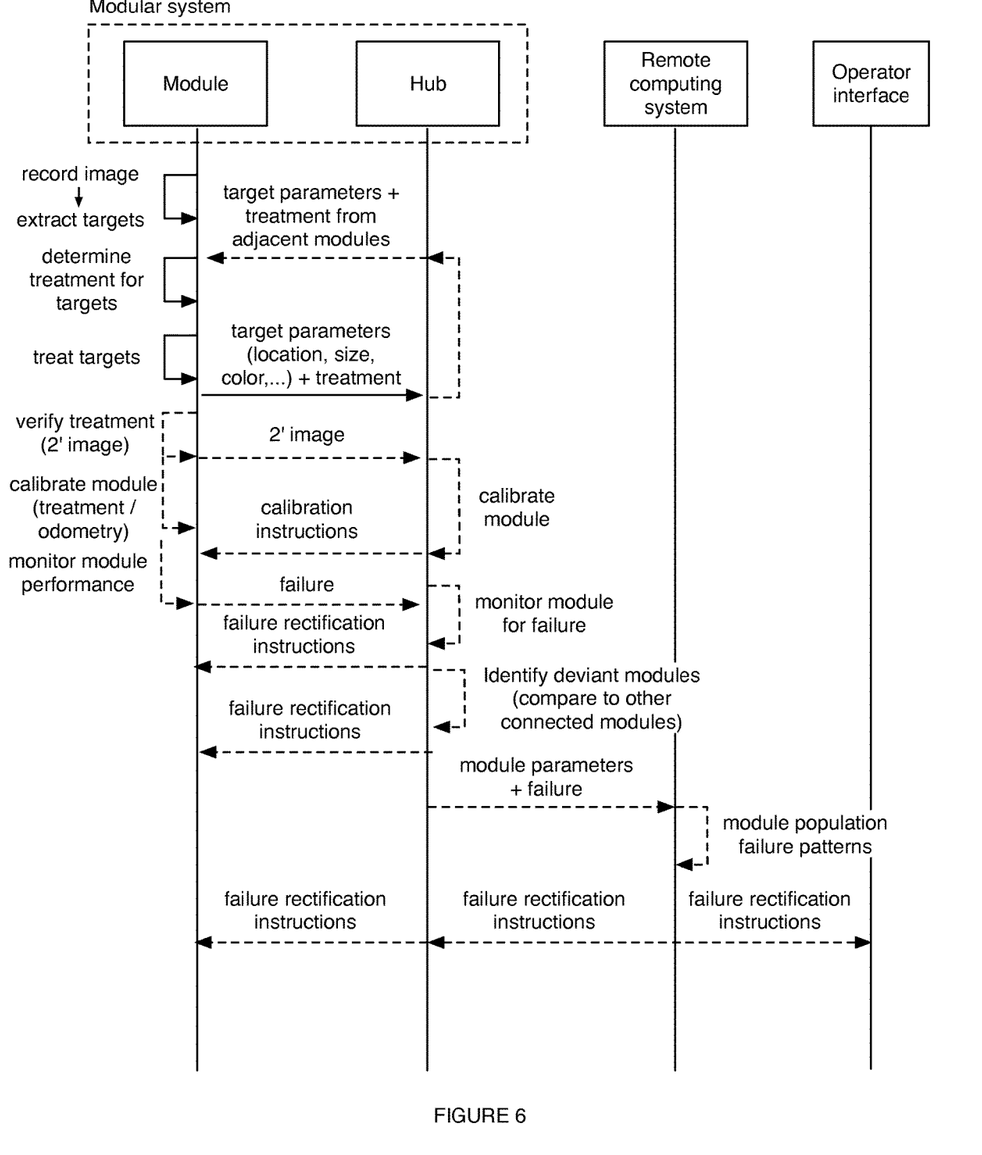
FIG. 6 is a schematic representation of a variation of module operation, module and hub interaction, and modular system and remote computing system interaction.

In some variations of the modular system, as shown in FIG. 6, each module is configured to capture and process a set of field measurements (e.g., images). The module can additionally or alternatively determine treatments for plants identified within the field measurement, treat the plants according to the determined treatment, verify the treatment, calibrate the treatment system, calibrate the imaging system, and/or monitor itself. Any of these processes require large amounts of processing power, and can be too slow for real-time treatment determination and application if performed by a single processor for the plurality of modules. To rectify this issue, processing steps can be distributed between the module and the hub. In one variation, time-sensitive or computationally-intensive processing steps, such as image processing, plant treatment determination, and treatment control, can be performed by the module, while time-insensitive and/or computationally simple functions, such as communication of monitoring summaries or communication of past treatment locations, can be performed by the hub.

The resource-intensive tasks can additionally or alternatively be distributed between the module processors connected to the hub. In one variation, each module independently processes the images it captured (e.g., in near-real time), and can additionally determine treatments for and apply treatments to the plants identified from the images, independent of substantially concurrent plant identification, plant treatment determination, and/or treatment application by other modules connected to the system. Distributing the computation amongst the modules results in a lighter computing load on each processor, thereby resulting in faster response times. Furthermore, centralizing the module-specific processes on the respective modules can eliminate data transfer lag and synchronization issues, enabling faster response times between image recordation and treatment application.

B. Drive Mechanism

The modular system is preferably utilized with a drive mechanism that functions to move the modular system throughout a geographic region, such as a field. The drive mechanism can be a portion of the modular system, or be a separate component. In one variation, the drive mechanism can be a truck, tractor, or other vehicle that is hitched or otherwise coupled to the modular system (e.g., to the hub, to one or more modules, etc.). The drive mechanism can drag the modular system through the field, push the modular system through the field, or otherwise mobilize the modular system.

C. Remote Computing System

The modular system can additionally be utilized with a remote computing system. The remote computing system can be a set of remote servers, a portable device, or a second modular system, or any other suitable computing system remote from the modular system. In one example, the remote computing system can be a tablet, laptop, or smartphone arranged within the drive mechanism (e.g., in the cab of the tractor). The remote computing system can function to monitor modular system operation, identify failure patterns across modular systems and/or modules (as shown in FIG. 6, described further below), generate and send failure rectification instructions to the modular systems and/or modules, record sample images or measurements of the modules, record the global position of retained or otherwise treated plants, or be used in any other suitable manner.

D. Hub

The hub of the modular system can facilitate inter-module communication, communicate with the remote system, function as a master control system for module power, determine relative module positions within the system, function as a synchronization leader for the modules (e.g., as a stratum 2 computer), function as a module monitoring system (e.g., compare the performance of connected modules to identify operation variances and/or failures, as shown in FIG. 6), and/or function as a real-time module performance adjustment system (e.g., generate and send adjustment instructions to bring the deviant module back within a threshold performance range of the other modules). The hub can additionally function as a module calibration system, function to determine treatments for targets identified by the modules, or perform any other suitable functionality.

Examples of inter-module communicated data can include spatial parameters (e.g., the time and/or location of the last plant retained in-situ by the module), population parameters (e.g., the size, shape uniformity, color, color uniformity, spacing uniformity, or other parameter of the retained plants). For uniformity, a mean of the value of plants selected to be kept may be used, and future selections are penalized for being farther away from the mean value. Shape uniformity may be in count of a number of pixels within captured sensor data, in units of area (e.g., $cm^2$), or another measure. Space uniformity is a very localized parameter, and may be updated on a row by row basis, or for different types of crops. Color uniformity may be measure of uniformity in "greenness", that is a measure of plant coverage, plant density, plant coverage, or another measure that indicates uniformity within captured sensor data (e.g., appearance of a particular color within collected image data).

Other types of inter-module communicated data can include module operation parameters (e.g., module height, module angle relative to the ground, and module angle relative to an adjacent module or the hub, inter-module spacing, module order, relative module position relative to its neighbors, etc.). However, any other suitable data can be communicated between modules. Information communicated with the remote system can include system operation parameters, module operation parameters, sample imagery received from one or more modules, plant parameters, fault notifications, software updates, synchronization data (e.g., time, global positioning system (GPS), position, and/or module trajectory information), or any other suitable information. The hub can function as a monitoring system by comparing the performance data of a first module to the aggregate performance data of the other connected modules and/or the historic performance data of the first module to detect module performance deviation and/or failure. However, the hub can otherwise monitor the modules for failures. Each modular system preferably includes a single hub, but can alternatively include multiple hubs, each coupled to a subset of the modules, or include no hub, wherein the modules form a mesh network.

The hub can include on-board memory, one or more processors, a module communication hub, and a casing. The hub can additionally include a remote communication module, power and data connections, external master controls (e.g., external module shutoff switches), one or more thermal management systems, water and/or corrosive material management, sensors, or include any other suitable component. The hub is preferably waterproofed and corrosion-resistant, but can alternatively be water permeable, corrodible, or have any other suitable property.

The on-board memory can include RAM, flash memory, hard drive, or any other suitable memory. The memory is preferably electrically connected to the one or more processors, but can alternatively be electrically connected to any other suitable component. The processor(s) function to perform all or most of the hub functionalities, and can include GPUs, CPUs, or any other suitable processing unit.

The module communication hub functions to communicate information between the modules and the hub. Alternatively, the module communication hub functions to communicate information between the modules connected to the hub. The module communication hub can function as a mere communication channel (e.g., wherein the information is pre-addressed by a sending module to receiving modules), or actively identify and send information to the receiver.

In one variation, the module communication hub can receive information from the sending module, determine the receiving modules (e.g., immediately adjacent modules) based on a module indexing database, and address the information to the receiving modules. In a second variation, the module communication hub can receive information from the sending module, determine the receiving module based on the information content, and address the information to the receiving module. In a third variation, the module communication hub can receive information from the sending module and broadcast the information to all modules.

In a fourth variation, the module communication hub can receive information from the sending module, process the information into global information and send (e.g., directed transmission or broadcast) the global information to other modules as well as other modular systems. The receiving modules and/or modular systems can then process the information in reverse, translating global information to local information so that they can act accordingly. For example, the hub processor can transform the positions of a newly identified plants from the sending modules' coordinate systems to a global coordinate system, determine treatments for each plant based on their locations relative to the other identified plants, and send the determined treatments to the module that identified the respective plant.

Each hub can include a module communication hub for each module, wherein a secondary communication hub communicates information between a first and second module communication hub. Alternatively, each hub can include a module communication hub that connects to multiple modules (e.g., a subset or all of the system modules) and controls inter-module communication. The module communication hub can be wired or wireless. Examples of wired connections include a CAN bus, CEBus, Cat5 cable, Ethernet, powerline modulation, or any other suitable data bus. Examples of wireless connections include long-range communication, such as WiFi (e.g., wherein the module communication hub can function as a router), RF, or cellular, short-range communication, such as NFC, BLE, or light modulation, or any other suitable wireless communication. However, the module communication hub can include any other suitable data communication channel such as USB, SATA, RS-232, or I2C.

When the power and/or data communication channel is wired, the hub can include power and/or data connections. The hub can include a fixed number of power and/or data connections (e.g., the maximum number of modules that can be supported by the hub, such as 24 connection ports), an adjustable number of power and/or data connections (e.g., wherein the number can be adjusted by adding or removing splitters, etc.), or any other suitable number of data connections. The connections can be quick-connects or any other suitable type of connector.

The hub casing functions to mechanically protect the hub components, and can additionally function as the water- and/or corrosion-resistant mechanism for the hub. In one variation, the hub casing substantially encloses the hub components, and can be substantially sealed except for the power and/or data connection ports. The hub casing can additionally define mounting points for the hub components, mounting points for the frame, handles, skids, or any other suitable mounting, handling, or assembly feature.

The hub can additionally include a remote communication module, which functions to communicate data from the hub to the remote processing system. The remote communication module is preferably a long-range communication system (e.g., WiFi, cellular, etc.), but can alternatively be any other suitable communication system.

The hub can additionally include one or more sensors. The hub sensors can include position sensors, such as GPS, cellular triangulation, or any other suitable position sensor. The position sensor measurement can be sent to the remote computing system, and can additionally be sent to the modules (e.g., to determine the global position of each module, determine the position of each module relative to the hub and/or adjacent modules, etc.). The hub sensors can additionally include environmental sensors, such as temperature sensors, light sensors, wind speed sensors, audio sensors, or any other suitable sensor. The environmental measurement can be sent to the modules and used to adjust region measurement parameters. For example, the ambient light measurement can be used to adjust the light emitters for the camera to accommodate for discrepancies between the target light intensity and the ambient light intensity. However, the environmental measurement can be otherwise used. However, the hub can include any other suitable sensor.

E. Module

The module of the modular system functions to record measurements of a field in-situ. In a specific example, the module functions to record images of the field while the modular system traverses through the field. The module can additionally process the measurement to identify treatment targets (e.g., crops, weeds, etc.) within the field, determine a treatment for the treatment target, control a treatment mechanism to treat the treatment target, verify treatment of the treatment target, monitor the accuracy of the treatment, monitor the treatment mechanism performance, monitor the imaging system performance, calibrate the imaging system, calibrate the treatment mechanism, and/or perform any other suitable functionality. The treatment determined for the treatment target can be based on past treatments by the module on other treatment targets within the same (current) run, be based on past (prior runs) or anticipated treatments by adjacent modules (e.g., immediately adjacent or within a threshold module distance of the first module) on other treatment targets within the current run (e.g., communicated to the module through the hub or directly from the adjacent module), be based on concurrently occurring treatments by adjacent modules on other treatment targets within the current run (e.g., communicated to the module through the hub or directly from the adjacent module), be based on past treatments on the same treatment target during previous (prior) runs, or be based on any other suitable information about the treatment region (e.g., field) or target. Generally, treatments are designed to either assist or deter the growth of plants in the geographic region.

The module includes a computing device that can include one or more processors, on-board memory, data communication system(s), set(s) of sensors, and casing(s). The module can additionally include one or more treatment mechanism(s), power supply, or any other suitable component. The module components are preferably substantially statically physically mounted (e.g., bolted) to the module frame or casing, but can alternatively be movably coupled to the module frame or casing so that they can move in position along some portion of the frame or casing.

Regardless of whether the modules are statically or movably coupled to the frame or casing, the modules are removably coupled to the frame or casing such that they can be detached between runs and swapped for other equivalent or different modules. In this way, if a module is in a failure state or is performing below desired performance levels, it can be removed, fixed, and replaced. Alternatively, some module designs may be more preferable for some tasks than others, and in this way the remainder of a modular system may be used while using the best suited module for each task.

In one variation, the module can include the system disclosed in U.S. application Ser. No. 13/788,320 filed 7

Mar. 2013 and/or that disclosed in U.S. application Ser. No. 14/444,897 filed 28 Jul. 2014 (incorporated herein in their entireties), but can alternatively include any other suitable system. The module can perform the method disclosed in U.S. provisional No. 61/943,158 filed 21 Feb. 2014 and its progeny, but can alternatively perform any other suitable method. The treatment mechanism can be one of those disclosed in U.S. application Ser. No. 14/444,897 filed 28 Jul 2014 (incorporated herein in its entirety), but can alternatively be any other suitable treatment mechanism.

Figure 1:
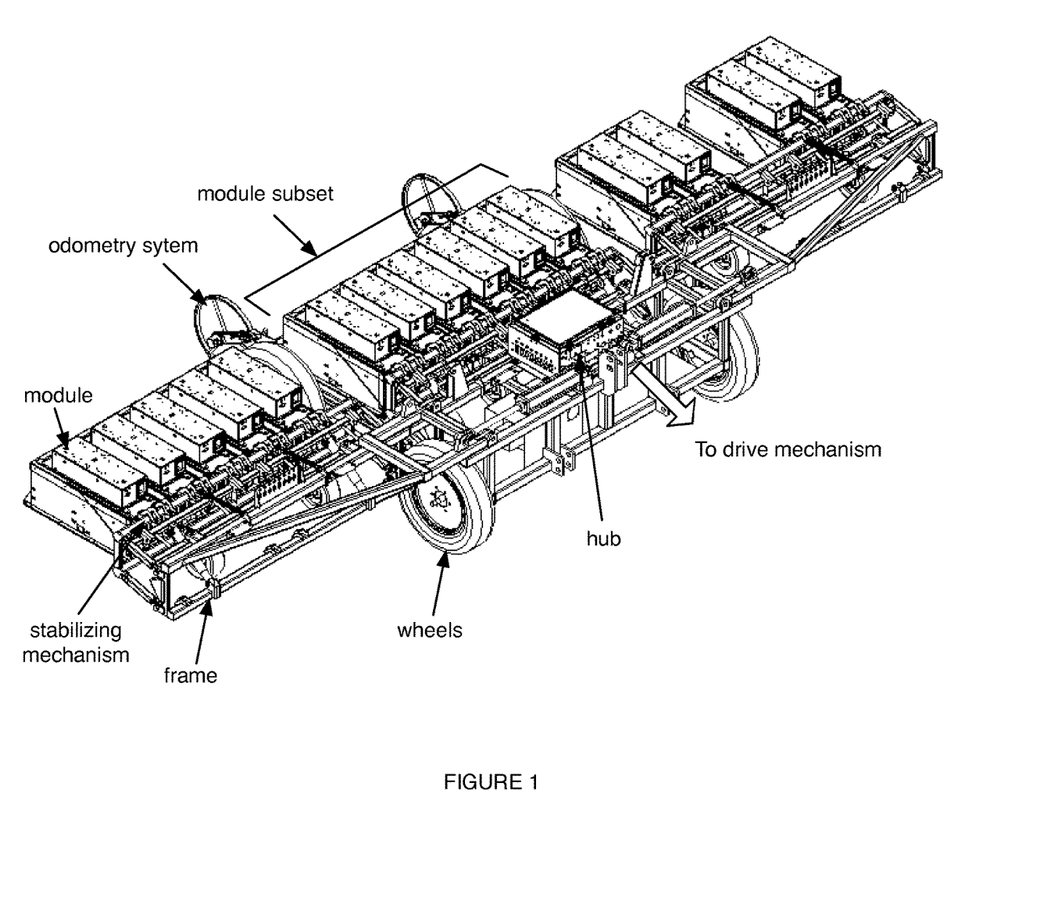
FIG. 1 is a perspective view of an example of the modular precision agriculture system.

The modular system preferably includes one or more modules, as shown in FIG. 1. The modules can be selected based on the field or plant being treated, the target crop pattern, the treatment capabilities of the module, the dimensions of the module, or selected based on any other suitable module parameter. The modules that make up a modular system can be substantially identical or different, and include different generations of module design, dimensions, weight, weight distribution, treatment mechanisms, sensors, imaging systems, or other component.

Each module is preferably associated with an identifier. The identifier can be unique (e.g., globally or within the system) or non-unique. The identifier can be dynamically determined or predetermined (e.g., assigned). The identifier can be automatically determined (e.g., by the hub, by the module, by the remote system, etc.), or manually determined (e.g., by a manufacturer or user).

The identifier can be an index indicating the position of the module within the system. In one variation, the module index can be determined based on the known location of a hub data or power connection port to which the module is connected. In this variation, the connection cables can be limited in length to limit module wire cross-over. In a second variation, the module index can be determined based on the position of the module within a chain of modules, wherein the modules can be connected together in series. In a third variation, the module index can be manually determined (e.g., through a dropdown menu, scan, etc.). In a third variation, the module index can be determined based on a global position of the module (e.g., determined based on a GPS system) relative to the global position of the hub (e.g., determined based on a second GPS system). In a fourth variation, the module index can be automatically determined based on the module mount (e.g., on the frame), wherein the module mount can communicate the module index to the module and/or communicate the module identifier to the hub. However, the module index can be otherwise determined.

Alternatively, the module identifier can be associated with the index and/or location identifier. However, the module identifier can be any other suitable identifier. The identifier can be used to identify the module with respect to the modular system (e.g., such that information can be addressed to the module, the modular system can indicate which module is failing, etc.), identify the module globally (e.g., wherein the remote system can retrieve module manufacturing parameters, such as which manufacturing batch the module's processor or batteries came from, based on the module identifier), or be used in any other suitable manner. The identifier can be used and/or stored by the hub, module, other modules, remote system, or other computing system.

The processor(s) function to perform all or most of the module functionalities. In one variation, the module can include a primary processor that functions to perform computationally-intensive processes, such as extracting treatment targets from the images, determining treatments for each plant, and determining a time or location for treatment mechanism actuation to achieve the treatment, and a secondary processor that functions to perform low-computation processes, such as controlling the treatment mechanism and controlling the imaging system. The primary processor is preferably multi-core, but can alternatively be single-core. The primary processor and/or secondary processor can include GPUs, CPUs, or any other suitable processing unit. The on-board memory can include RAM, flash memory, hard drive, or any other suitable memory. The memory is preferably electrically connected to the one or more processors, but can alternatively be electrically connected to any other suitable component.

The data communication system functions to communicate data to and from the module. The data communication system is preferably configured to connect to (and is complimentary to) the module communication hub of the hub, but can alternatively couple to (and be complimentary to) a data connector of a second module.

The module sensors are preferably not redundant with those of the hub, but can alternatively be redundant. Example module sensors can include image sensors (e.g., CCD, multispectral, hyperspectral, or stereo cameras; other image sensors such as that disclosed in U.S. application Ser. No. 14/329,161 filed 11 Jul. 2014, incorporated herein in its entirety by this reference), optical sensors (such as sensors that determine the height of a module off the ground based on reflected light information or laser scanners), audio sensors, environmental sensors (e.g., light sensors for adjustment of the module's light emitters, temperature sensors, etc.), accelerometers, gyroscopes, or any other suitable sensor. Different modules can include different sets of module sensors. Alternatively, all modules can include the same module sensors.

Figure 2:
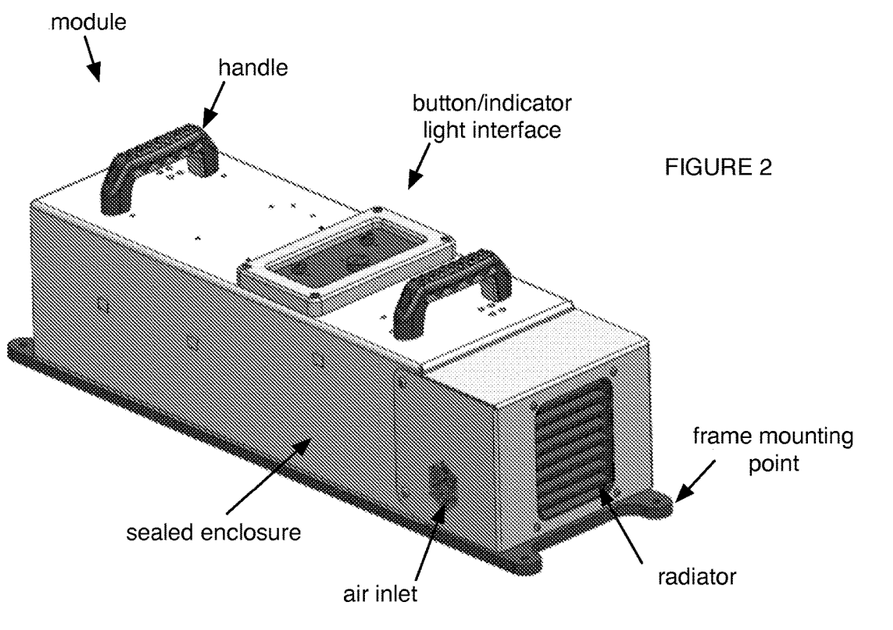
FIG. 2 is a perspective view of the top of an example of the module, including a liquid cooling system.
Figure 3:
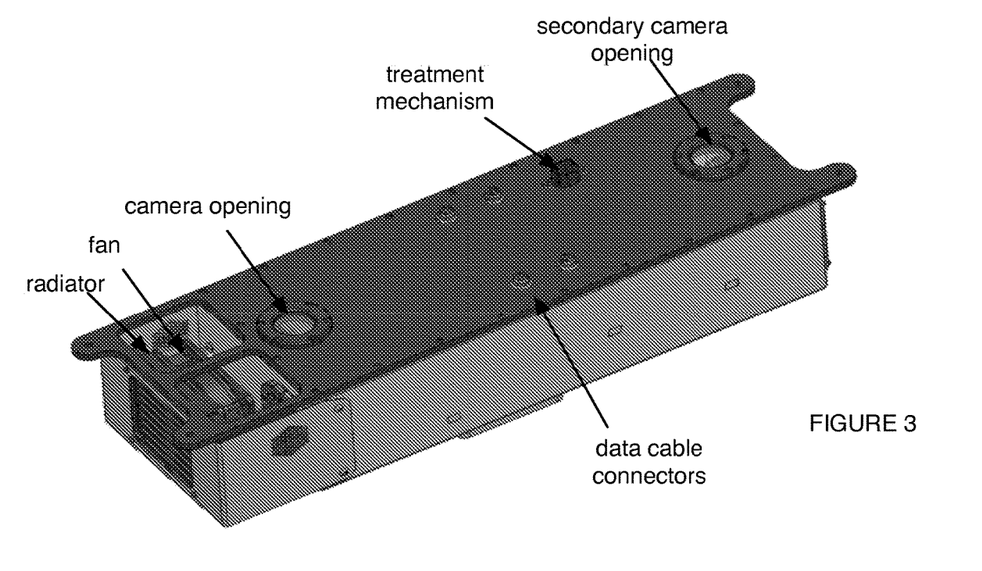
FIG. 3 is a perspective view of the bottom of the example of the module of FIG. 2.
Figure 4:
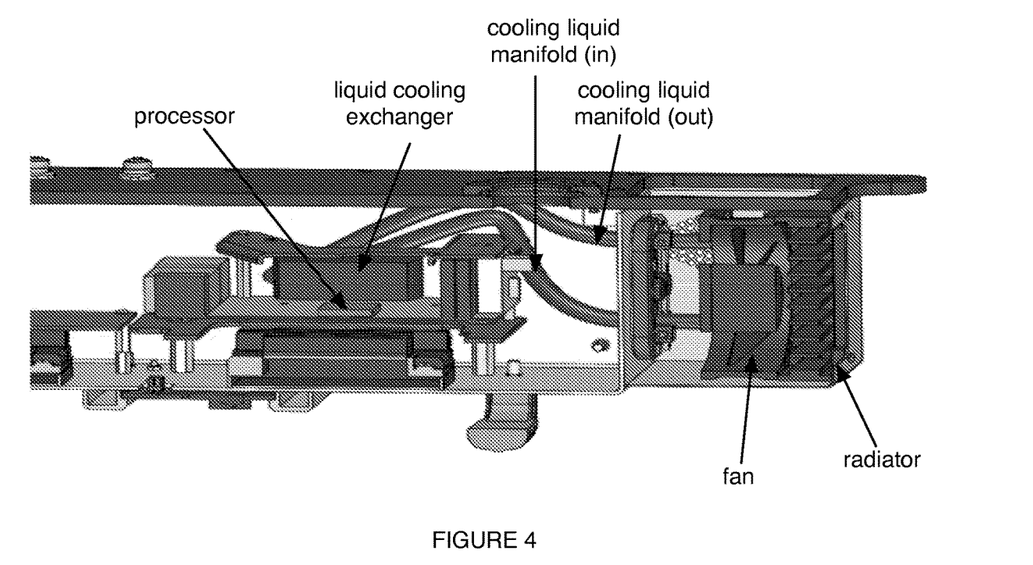
FIG. 4 is a cross-sectional view of the example of the module of FIG. 2.

The module casing functions to mechanically protect the module components, and can additionally function as the water- and/or corrosion-resistant mechanism for the module. In one variation, as shown in FIGS. 2, 3, and 4, the module casing substantially encloses the module components, and can be substantially sealed except for the power and/or data connection ports. The module casing can additionally define mounting points for the hub components, mounting points for the frame, handles, skids, or any other suitable mounting, handling, or assembly feature.

The module can additionally include a treatment mechanism that functions to apply the treatment material to the treatment target (e.g., field or plant). The treatment mechanism can be one of those disclosed in U.S. application Ser. No. 14/444,897, a sprayer (e.g., a foam sprayer) or be any other suitable treatment mechanism. Each module can include one or more treatment mechanisms of the same or different type. In a specific example, the module can include a linear array of treatment mechanisms (e.g., solenoid-controlled spray nozzles) extending along an axis perpendicular to the axis of travel and/or parallel to an axis shared between the respective module and an adjacent module. However, the treatment mechanism can be otherwise arranged.

Figure 5:
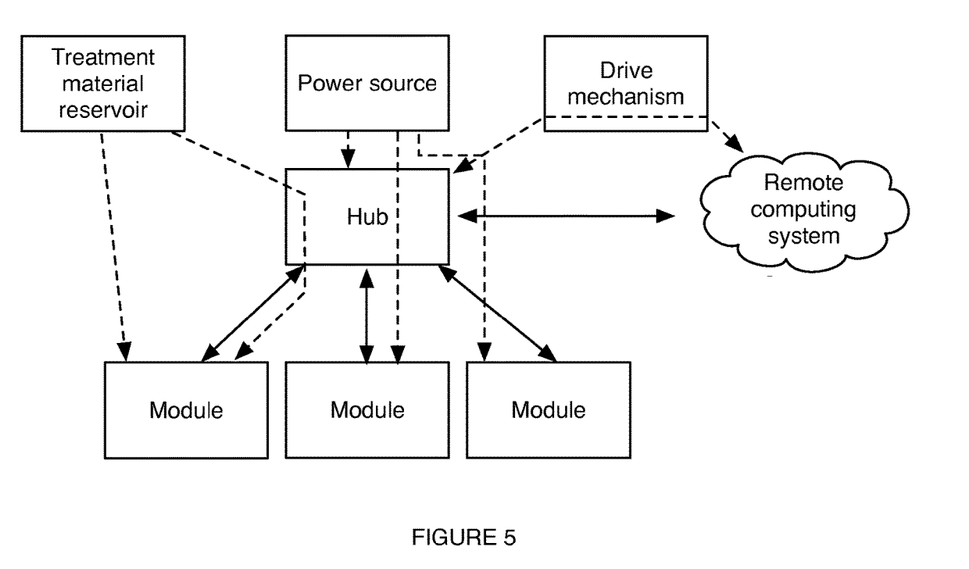
FIG. 5 is a schematic representation of different variations of data communication between the modules, hub, and remote computing system; power transmission from the power source to the hub and modules; and treatment material supply from the treatment material reservoir to the modules.

The module can additionally include a treatment material inlet that functions to connect the treatment mechanism to a treatment material reservoir or source. The treatment material can be liquid (e.g., fertilizer, water, etc.), gas, foam, heat, radiation, or any other suitable treatment material. The treatment material reservoir can be a fluid container (e.g., when the treatment material has substantial mass, such as liquid, gas, or foam), a secondary battery (e.g., when the treatment material is heat or other radiation), or be any other suitable reservoir. The treatment material reservoir can be arranged on the drive mechanism, on the hub, on one module of the set, on each module, or be otherwise arranged. The treatment material reservoir can be arranged above the treatment mechanisms, or can be arranged in any other suitable position. Treatment material can be supplied from the reservoir to the mechanism by a material actuation mechanism (e.g., a pump, auger, etc.) located on the module, hub, or any other suitable component; gravity (e.g., be gravity-fed); pressure; or be otherwise supplied. The treatment material can be directly supplied to the modules, or be supplied to individual modules by a distribution hub on the hub (both variations shown as dotted lines in FIG. 5). The distribution hub can be actively or passively controlled.

In one example, the treatment material can be a liquid, wherein the treatment material reservoir is arranged on the hub. The hub can additionally include treatment material outlets, wherein a treatment material manifold can fluidly connect the treatment material outlets to the treatment material inlets (e.g., through a quick-connector). In operation, the module can control treatment material supply to the treatment mechanism by controlling a pump that sucks the treatment mechanism from the reservoir toward the treatment mechanism.

F. Frame

The frame of the modular system functions to mount the modules together, and can additionally function to mount the modules to the hub, mount the modular system to the drive mechanism, mount the treatment material reservoir, the power supply, the modular system wheels, the odometry system and/or support any other suitable modular system component. The frame is preferably substantially rigid, but can alternatively be flexible and/or jointed. The frame preferably statically mounts the modular system components, but can alternatively movably mount the components (e.g., wherein the components can rotate relative to the frame, translate along the frame, etc.). The frame can mount the components at discrete mounting points (e.g., wherein the frame includes discrete screw holes), or mount the components at a substantially continuous mounting point (e.g., include a mounting groove). The modules and/or hub can mount to the frame using transient mounting mechanisms, such as clips, bolts, and screws, or can mount to the frame using substantially permanent mounting mechanisms, such as adhesive, rivets, and welded junctions. However, the components can be mounted to the frame in any other suitable manner.

G. Stabilizing Mechanisms

The modular system can additionally include one or more stabilizing management mechanisms that function to stabilize the modular system. The stabilizing management mechanism can include weight distribution management, vibration management, or any other suitable mechanism capable of controlling system stability. Weight distribution management can be passive or active, and/or be automatic or manual. In one example, weight distribution management can include adding or removing unused modules, dummy modules, or other counterweights to counterbalance active modules.

Vibration management (e.g., dampers and/or isolators) can function to reduce vertical module travel as the module is moved along the field. Additionally or alternatively, the vibration damping can function to reduce module movement relative to the hub, such that any power, data, and treatment material connections are better maintained. Vibration isolators can include passive isolators (e.g., air isolators, springs, spring-dampers, elastomeric or foam pads or mounts, negative-stiffness isolators, wire rope isolators, tuned-mass dampers, etc.), active isolators (e.g., a vibration sensor coupled to a controller and an actuator, piezoelectrics, etc.), or any other suitable isolator. Vibration dampers can include viscous dampers, coulomb dampers, structural/solid dampers (e.g., spring-loaded junctions, multi-bar linkage junctions, etc.), or any other suitable damper. The vibration management can be arranged within the module (e.g., wherein the vibration management damps or isolates the module components from vibration), at the module mounting point (e.g., between the frame and module), at the mounting point for a set of modules, at the hub mounting point, within the hub, or at any other suitable location. The damping and/or isolation force can be fixed or variable. The variable force can be manually adjusted, automatically adjusted (e.g., passively or actively), or otherwise adjusted.

H. Power Distribution

The modular system can additionally include a power distribution hub, which functions to distribute power from the power source to the hub and/or individual modules. The power source can be an electricity generator (e.g., the motor of the drive mechanism, a secondary motor, a fuel cell, etc.), a set of batteries (e.g., secondary batteries), or any other suitable power source. The power distribution hub can be arranged on the hub, on the drive mechanism, on the frame, on one or more modules, or at any suitable location within the system. The power distribution hub can be the same as the data communication hub, or be different. The power distribution hub is preferably electrically connected between the source and sink, but can be otherwise connected. The power distribution hub can be wired or wireless (e.g., inductive charger). In one variation, as shown as dotted lines in FIG. 5, the power distribution hub directly connects a power source to the modules and/or hub. In a second variation, as shown as dotted lines in FIG. 5, the power distribution hub can distribute power to the hub, wherein the hub distributes power to the modules. However, power can be distributed in any other suitable manner.

I. Odometry

The modular system can additionally include a positioning system that functions to measure or estimate change in position over time. The position change over time can be used in plant treatment (e.g., wherein plants can be treated in-situ in real time based on the change in system position), treatment verification, performance monitoring, or in any other suitable process. The positioning system can be an odometry system, dead reckoning system, hybrid thereof, drive mechanism odometer, or any other suitable system. The odometry system can be a visual odometry system, mechanical odometry system, or other odometry system. The dead reckoning system can be a GPS navigation system, cell triangulation system, LIDAR system, ultrasonic navigation system, or any other suitable navigation system. The modular system can include one or more positioning systems.

In one variation, the modular system includes one positioning system on the hub. The hub can receive the positioning system output and send the positioning system output to the connected modules. The modules each can receive the positioning system output and individually transform the output into module coordinates, and use the transformed output to determine the location of a treatment target (global or relative to a module component), determine when to actuate the treatment mechanism to treat the treatment target, or use the transformed output in any other suitable manner. Alternatively, the hub can determine the absolute distance travelled (e.g., based on the positioning system measurement alone, or based on the positioning system measurement and measurements from a secondary system, such as a GPS system) and send the distance to the modules for use.

In a second variation, the modular system includes a positioning system for each subset of modules (e.g., one or more modules). The modules can each receive the positioning system measurements (e.g., wheel encoder ticks) and individually determine the distance travelled. Alternatively, a single module (first module) of each set can receive the positioning system measurements, determine the distance travelled, and send the determined distance to the remaining modules of the set. The first module can additionally confirm or take into account (e.g., average) the distance travelled as determined by other first modules of other module sets. However, the positioning system can be otherwise located and the output otherwise used.

J. Thermal Management

The modular system can additionally include a thermal management system which functions to cool the module components. The hub and modules can both include thermal management systems. Alternatively, only the hub or only the modules can include thermal management systems. The thermal management system can be a passively cooled system or an actively cooled system. The thermal management system can be a fluid cooled system, a thermoelectric cooling system (e.g., a peltier cooler), laser cooling system, free cooling system, or any other suitable cooling system. The fluid-cooled system can be active or passive. In the active system, a heat transfer fluid can be pumped through the cooling system (e.g., the thermal management system fluid manifolds), wherein the fluid manifolds can be thermally connected to heat-generating and/or radiating components, such as the heatsink on a processing unit. The fluid manifolds can additionally be fluidly connected to a radiator, wherein the radiator can be fluidly and/or thermally connected to the ambient environment. The radiator can additionally include a fan that blows air over the radiator to facilitate heat dissipation. The fluid manifolds can extend through the fins of the radiator or extend along a radiator manifold, wherein the radiator fins can be substantially solid be thermally connected to the radiator manifold. The heat transfer fluid (coolant) can be a phase change material or be substantially liquid or gaseous at the ambient and system temperatures. The heat transfer fluid can be air, water, liquid nitrogen, liquid helium, pAG, oil, freon, refrigerant, liquid gases, nanofluid, liquified gas, gas, treatment material (e.g., fertilizer), or any other suitable heat transfer fluid.

The thermal management system can additionally function to accommodate for the liquid- and/or corrosion-proofing features of the system. In one variation of the system wherein the hub and/or module is liquid- and/or corrosion-proofed by enclosing the hub and/or module components in a substantially liquid impermeable (e.g., hermetically sealed) casing (enclosure), as shown in FIGS. 2, 3, and 4, a liquid cooling system can be used, wherein the manifolds of the liquid cooling system can thermally couple to the processor(s), memory, and other heat-generating components of the hub and/or module. The radiator can be arranged at an end of the casing, wherein the radiator fins can be arranged along the casing exterior. The radiator can additionally include a fan opposing the radiator fins. The cooling fluid reservoir is preferably a portion of the casing, but can alternatively be arranged remote the cooled system. However, the system can be otherwise water- and/or corrosion proofed (e.g., with a hydrophobic coating over the components, with membranes that selectively egress fluid and/or corrosive material, etc.). The thermal management system or casing can additionally include a liquid-selective membrane (e.g., Gore Tex™ membrane) or valve that functions to selectively egress water or other accumulated liquids from the casing interior. However, the thermal management system can include any other suitable component

K. Fault Tolerances

Returning FIG. 6, the modular system is configured to self-monitor and report its behavior, and either self-correct at the individual hub or module level, or receive failure rectification instructions sent from a remote computing system (originated at the remote computing system or from a separate operator interface.

More specifically, individual module and/or hub monitoring can function to identify system failures, treatment mechanism failures, or failure of any other suitable system component or functionality. The modular system can send a notification to the drive mechanism (e.g., to a user interface within the cab of the tractor), send a notification to a remote system (e.g., remote monitoring system), store an error message on-board the system, or perform any other suitable action in response to identification of a failure.

Examples of failures include solenoid sticking (e.g., failure on or failure off), overtreatment (e.g., treatment of adjacent regions or plants), undertreatment (e.g., treatment of only a portion of the region or plant to be treated), dripping, incorrect treatment mechanism operation, module failure, hub failure, lack of treatment material to apply, or any other suitable failure.

In one embodiment, individual module behavior is at least in part monitored (e.g., self-monitored, manually monitored, or remotely monitored) based on a monitoring image. The monitoring image can be a second captured image that is also used for odometry calibration, the verification image, or any other suitable image. The monitoring image can be recorded by the detection sensor, verification sensor, or any other suitable sensor. Other types of monitoring may also be used in place of or in conjunction with monitoring images.

Following the example process illustrated in FIG. 6, in one embodiment each module captures images of crops using sensors and extract targets or areas for treatment. The module determines treatments for targets, in some cases at least in part based on target parameters and treatments determined by adjacent modules. The treatment mechanism that is a part of each module treats the targets. Another sensor on the module then verifies the applied treatment (for example using a 2 foot wide image). This verification image or any other collected data may be communicated to the hub to assist in monitoring the module or modular system as a whole for failure conditions. The module and/or the hub uses the verification image and/or any other collected data to both calibrate the module and/or hub and monitor the module performance.

In a first variation, monitoring individual module performance includes monitoring the treatment mechanism by: comparing a first set of treatment correction factors to a plurality of treatment correction factor sets, and determining a treatment mechanism failure in response to the first set of treatment correction factors deviating from the plurality beyond a threshold deviation. For example, a least-squares method (e.g., linear or non-linear least squares) can be applied to the plurality of treatment correction factors sets, wherein deviants from the best fit equation can be identified as outliers. These outliers can be identified as treatment mechanism errors, and can additionally or alternatively be removed from the plurality of treatment correction factor sets used to determine the treatment correction factors for use in treatment calibration. An error for the timestamp and/or geographic location associated with a first or a second image of a first image pair as a module travels through the field can additionally be generated if the first set of treatment correction factors qualify as an outlier. The treatment correction factors can be determined during treatment calibration or be determined in any other suitable manner. The treatment correction factors can include a camera-to-treatment mechanism distance correction factor value and a timing delay value, and can additionally or alternatively include any other suitable correction factor. The first set of treatment correction factors is preferably extracted from a first image pair, while the plurality of treatment correction factor sets can be extracted from a plurality of image pairs recorded before and/or after to the first image pair.

In a second variation, a failure of a module and its respective treatment mechanism can be detected in response to identification of a difference between the target treatment boundary location and the actual treatment boundary location (e.g., the error determined during treatment calibration) exceeding a threshold difference. The threshold difference can be ½ an inch, ¼ of an inch, or be any other suitable distance. However, a failure can be identified in response to determination that the treatment mechanism is continuously treating (e.g., failed on, as determined from the verification or monitoring image), has failed to treat (e.g., failed off, as determined from the verification or monitoring image), is dripping or otherwise applying treatment between active treatment operation (e.g., as determined from the verification or monitoring image), has entirely or partially treated a second plant with treatment intended for a first plant, has failed to treat all or a portion of the region or plant to be treated, in response to determination that more than a threshold number of plants have been mistreated (e.g., have had the wrong treatment applied to them), in response to determination that an incorrect treatment mechanism was operated (e.g., based on the location of the treatment indicators within the verification or monitoring image), or in response to detection of any other suitable failure condition. The failure conditions identified from the images can be learned (e.g., using machine learning techniques), manually identified, or otherwise identified.

Individual module performance parameters and individual module failures may be communicated outward in reports to the hub. The hub uses failure and parameters reports to identify deviant modules based on the relative performance and failure rates of the modules installed in the modular system. The hub may use these reports to correct the modular system's behavior as a whole. For example, if all modules are providing misaligned by a certain amount, the hub may use the collected, reported information to instruct the drive mechanism to turn left, turn right, speed up, slow down, or otherwise globally correct a misalignment.

The hub may also use the collected parameter and failure reports to provide individual failure rectification instructions to individual modules based on data collected from multiple modules. Examples would include information, such as information that light is leaking into the module affecting sensor performance, that the power level is low, and that the sensor system, such as an image sensor implementation, is not confident in its detections of plants, treatments, or treatment verifications.

The hub may also aggregates failure and parameter information for reporting to the remote computing system. Similarly to the hub, the remote computing system may also provide corrections (failure rectification instructions) to the modular system as a whole or to individual modules. The remote computing system may have access to information not available to the modular system, such as weather information, performance data regarding other modular systems, historical performance data regarding the lifetime performance of different generations (iterations) of module design, etc. In one example, the remote computing system may include machine learning models to train models for identifying patterns in module population failures, store those models, identify occurrences of those patterns, and communicate identification of those patterns in active modular systems to provide failure rectification instructions specifically designed to address those patterns of problems.

The remote computing system may also make modular system failure and parameter reports available in an operator interface (e.g., a graphical user interface) via a computing device. A human operator may review the information and provide their own failure rectification instructions, which may feed back down to the remote computing system, hub, and even individual modules to adjust behavior at any or all levels to remedy the detected failures or performance variations.

In one embodiment, a method includes receiving at a module communication hub a plurality of reports, each report being transmitted from a different one of a plurality of modules, the modules communicatively coupled with the module communications hub, the modules and the module communications hub both being physically coupled to a modular system wherein the modules are physically coupled relative to each other so that each module can operate with respect to a different one of a plurality of different rows of plants in a geographic region. Each report may indicate an inability of one of the modules to properly apply or report a treatment by a treatment mechanism of each corresponding module to within a threshold performance parameter. The reports may be based on sensor data, treatment data, calibration data, etc.

A failure rectification instruction is obtained based on the received reports. Obtaining the failure rectification instruction may include evaluating the failure reports received by the modules together to determine a failure rectification instruction for one of the modules that provided one of the received failure reports. Obtaining the failure rectification instruction may alternatively include sending the received failure reports to a remote computing system, and responsive to sending the failure reports, receiving the failure rectification instruction from the remote computing system, the failure rectification instruction based on activity of at least one other modular system including a plurality of different modules.

The failure rectification instruction is sent to the module. A performance report may be received from the module to which the failure rectification instruction was sent where the performance report indicates that following the failure rectification instruction, the module is properly applying the treatment to within the threshold performance parameter.

L. Global Coordinate Frame Data

As introduced above, the hub of each modular system may communicate data to the remote computing system and/or to the hubs of other modular systems. Much in the same way an individual modules may use data from other adjacent modules (such as what treatments were applied) to determine what treatments they should apply, the module communication hub of a modular system may use data from other modular systems to determine what treatments it should apply.

To accomplish this, in one embodiment the hub processor of a (first) modular system transforms a dataset that either includes modular system position/geolocation information or indexes data by position/geolocation, such as the locations of individual treated or untreated plants, the areas treatments were applied to, the areas traveled by the modular system, etc. from the modular system's coordinate system (and/or, an individual module's coordinate system) (also referred to as a local reference frame to the module or modular system) into a global coordinate system (e.g., Cartesian coordinates on a georeferenced map, such as by latitude and longitude). (also referred to as a global reference frame). This global position information of activity of the first modular system is transmitted to other modular systems and/or to a remote computing system. In the case of the remote computing system, the system may act as a universal recipient of data from multiple active modular systems. The data may be indexed by time as well as by location.

Other active modular systems, such as those concurrently active with other modular system, may also be receiving information from other concurrently active modular systems. This may occur while concurrently or asynchronously sending its own data to other modular systems and/or the remote computing system. A second of these other active modular systems receives data from the first active modular system or the remote computing device (which may include historical data). The computer of the second modular system transforms the global position information of activity from the first modular system or other historical modular system activity into its respective coordinate system (which may include the local coordinate system of the modular system as a whole, or the local coordinate system of each individual module on the second modular system). The actions taken by the modules of the second modular system may then be determined at least in part on this transformed information.

In one embodiment, a method includes receiving at a modular system a dataset comprising position data in a global reference frame, where the modular system includes plurality of modules physically coupled relative to each other so that each module can operate with respect to a different one of a plurality of different rows of plants in a geographic region. The dataset may be received from another modular system or from a remote computing device. The dataset may include data regarding the locations of individual treated or untreated plants, the areas treatments were applied to, the areas traveled by the modular system, etc. The modular system moves through the geographic region. A sensor on one of the modules is activated to capture field measurement data of individual plants along one of the rows as the modular system moves through the geographic region. A computer included within the module transforms the position data from the dataset from the global reference frame to a local reference frame, where the local reference frame is either local to the modular system or local to the module itself. The computer is used to determine a treatment for the individual plants as the modular system moves through the geographic region, where the treatment is determined based on the field measurement data and the position data in the local reference frame. The module applies the treatment to the individual plants using a treatment mechanism before the modular system passes by the individual plants.

M. Additional Considerations

Although omitted for conciseness, the preferred embodiments include every combination and permutation of the various system components and the various method processes.

The term "coupled" in this description means two items that are connected directly or indirectly in some manner. For example, two items that are physically coupled may be in direct contact with each other, or they may be in indirect contact through some intermediate element. This is the case with modules which may either be directly physically contacting the frame, or they may be physically coupled to the frame indirectly through another system such as a module damping mechanism. Similarly, two computers such as the hub communications module and the remote computing system may be communicatively coupled through a wireless network that may include transceiver components and wireless base stations location in between the hub and remote computing system. As another example, individual modules may also be communicatively coupled to each other or to the hub through an intermediate Ethernet connection or CAN bus.

As a person skilled in the art will recognize from the previous detailed description and from the figures and claims, modifications and changes can be made to the preferred embodiments of the invention without departing from the scope of this invention defined in the following claims.

What is claimed:

1. A method for identifying and treating plants using a farming machine, the method comprising:
    identifying a plant in a first image, the first image captured with a first camera system of a first treatment module;
    determining first treatment information for a first treatment mechanism of the first treatment module to treat the plant;
    accessing, at a second treatment module spatially adjacent to the first treatment module, the first treatment information;
    identifying, at the second treatment module, the plant in a second image, the second image captured with a second camera system of a second treatment module;
    determining, at the second treatment module, second treatment information for a second treatment mechanism of the second treatment module to treat the plant;
    generating, at the second treatment module, a treatment for the plant using the first treatment information accessed at the second treatment module and the second treatment information determined at the second treatment module; and
    actuating the second treatment mechanism of the second treatment module to apply the treatment to the plant.

2. The method of claim 1, wherein identifying the plant in the first image further comprises:
    capturing, at the first treatment module, the first image with the first camera system;
    transmitting the first image to the second treatment module; and identifying, at the second treatment module, the plant in the first image.

3. The method of claim 1, wherein identifying the plant in the first image further comprises:
capturing, at the first treatment module, the first image with the first camera system, and
identifying, at the first treatment module, the plant in the first image.

4. The method of claim 1, wherein accessing the first treatment information at the second treatment module further comprises:
determining the first treatment information at the first treatment module;
receiving the first treatment information at the second treatment module from the first treatment module; and
storing the first treatment information at the second treatment module.

5. The method of claim 1, wherein accessing the first treatment information at the second treatment module further comprises:
receiving the first image at the second treatment module;
determining, at the second treatment module, the first treatment information based on the first image; and
storing the first treatment information at the second treatment module.

6. The method of claim 1, wherein:
determining the first treatment information further comprises determining a treatment type for the plant based on the first image;
determining the second treatment information further comprises determining a location of the plant based on the second image; and
generating the treatment for the plant using the first treatment information and the second treatment information is based on the treatment type for the plant and the location of the plant.

7. The method of claim 1, wherein:
determining the first treatment information further comprises identifying the plant as a treatment target for the farming machine based on the first image;
determining the second treatment information further comprises confirming the plant as the treatment target for the farming machine based on the second image; and
generating the treatment for the plant using the first treatment information and the second treatment information is based on identification of the plant as the treatment target and confirmation of the plant as the treatment target.

8. The method of claim 1, wherein:
determining the second treatment information further comprises accessing information describing a previous treatment of the plant; and
generating the treatment for the plant using the first treatment information and the second treatment information uses the information describing the previous treatment of the plant.

9. The method of claim 1, wherein:
determining the first treatment information further comprises identifying a position of the plant based on the first image;
determining the second treatment information further comprises verifying the position of the plant based on the second image; and
generating the treatment for the plant using the first treatment information and the second treatment information is based on identifying the position of the plant and verifying of the position of the plant.

10. The method of claim 1, wherein:
determining the first treatment information further comprises identifying a time to treat the plant based on the first image;
determining the second treatment information further comprises verifying the time to treat the plant based on the second image; and
generating the treatment for the plant using the first treatment information and the second treatment information is based on identifying the time to treat the plant and verifying the time to treat the plant.

11. The method of claim 1, wherein:
determining the first treatment information further comprises determining operating parameters of the first treatment mechanism to treat the plant;
determining the second treatment information further comprises determining operating parameters of the second treatment mechanism; and
generating the treatment for the plant using the first treatment information and the second treatment information is based on the determining operating parameters of the first treatment mechanism to treat the plant and the determined operating parameters of the second treatment mechanism.

12. The method of claim 1, further comprising:
generating, at the first treatment module, an other treatment for the plant using the first treatment information; and
actuating the first treatment mechanism of the first treatment module to apply the other treatment to the plant.

13. The method of claim 12, wherein:
determining the first treatment information for the first treatment mechanism comprises accessing information describing the other treatment; and
generating the treatment for the plant using the first treatment information and the second treatment information is based on accessed information describing the other treatment.

14. The method of claim 13, wherein actuating the first treatment mechanism to apply the other treatment and actuating the second treatment mechanism to apply the treatment occur concurrently.

15. The method of claim 13, wherein actuating the first treatment mechanism to apply the other treatment occurs at a time before actuating the second treatment mechanism to apply the treatment.

16. The method of claim 1, wherein the first treatment module is positioned adjacent to the second treatment module laterally in a direction perpendicular to a direction of travel of the farming machine.

17. The method of claim 1, wherein the first treatment module is position adjacent to the second treatment module laterally in a direction parallel to a direction of travel of the farming machine.

18. A non-transitory computer readable storage medium storing instructions for identifying and treating plants using a farming machine, the instructions, when executed by one or more processors, causing the one or more processors to:
identify a plant in a first image, the first image captured with a first camera system of a first treatment module;
determine first treatment information for a first treatment mechanism of the first treatment module to treat the plant;

access, at a second treatment module spatially adjacent to the first treatment module, the first treatment information;

identify, at the second treatment module, the plant in a second image, the second image captured with a second camera system of a second treatment module;

determine, at the second treatment module, second treatment information for a second treatment mechanism of the second treatment module to treat the plant;

generate, at the second treatment module, a treatment for the plant using the first treatment information accessed at the second treatment module and the second treatment information determined at the second treatment module; and actuate the second treatment mechanism of the second treatment module to apply the treatment to the plant.

19. A farming machine comprising:

a first treatment module comprising:
- a first treatment mechanism configured to treat plants when actuated,
- a first camera system configured to capture images of plants,
- a first processor, and
- a first non-transitory computer readable storage medium storing first instructions for identifying and treating plants, the first instructions, when executed the first processor, causing the first processor to:
  - identify a plant in a first image captured with the first camera system, and
  - determine first treatment information for the first treatment mechanism to treat the plant; and a second treatment module comprising:
- a second treatment mechanism configured to treat plants when actuated,
- a second camera system configured to capture images of plants,
- a second processor, and
- a second non-transitory computer readable storage medium storing second instructions for identifying and treating plants, the second instructions, when executed the second processor, causing the second processor to:
  - access the first treatment information,
  - identify the plant in a second image captured with the second camera system,
  - determine second treatment information for the second treatment mechanism to treat the plant,
  - generate a treatment for the plant using the first treatment information and the second treatment information, and
  - actuate the second treatment mechanism to apply the treatment to the plant.

* * * * *